US008543445B2

(12) United States Patent
Hall, III

(10) Patent No.: US 8,543,445 B2
(45) Date of Patent: Sep. 24, 2013

(54) SYSTEM AND METHOD FOR DIRECT MAILING INSURANCE SOLICITATIONS UTILIZING HIERARCHICAL BAYESIAN INFERENCE FOR PROSPECT SELECTION

(75) Inventor: Arlest Bryon Hall, III, Farmington, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 697 days.

(21) Appl. No.: 12/643,344

(22) Filed: Dec. 21, 2009

(65) Prior Publication Data

US 2011/0153419 A1 Jun. 23, 2011

(51) Int. Cl.
  *G06Q 10/00* (2012.01)
(52) U.S. Cl.
  USPC .......................................... 705/7.29; 705/7.31
(58) Field of Classification Search
  USPC ................................ 705/7.29, 7.31
  See application file for complete search history.

(56) References Cited

U.S. PATENT DOCUMENTS

| | | | | |
|---|---|---|---|---|
| 6,026,397 | A * | 2/2000 | Sheppard | 1/1 |
| 6,061,658 | A * | 5/2000 | Chou et al. | 705/7.33 |
| 6,338,066 | B1 * | 1/2002 | Martin et al. | 707/708 |
| 6,430,539 | B1 * | 8/2002 | Lazarus et al. | 705/7.31 |
| 6,567,786 | B1 * | 5/2003 | Bibelnieks et al. | 705/14.44 |
| 6,629,095 | B1 * | 9/2003 | Wagstaff et al. | 1/1 |
| 6,640,215 | B1 * | 10/2003 | Galperin et al. | 706/19 |
| 6,839,682 | B1 * | 1/2005 | Blume et al. | 705/7.31 |
| 6,970,830 | B1 * | 11/2005 | Samra et al. | 705/7.28 |
| 7,006,979 | B1 * | 2/2006 | Samra et al. | 705/7.28 |
| 7,020,593 | B2 * | 3/2006 | Hong et al. | 703/2 |
| 7,062,477 | B2 * | 6/2006 | Fujiwara et al. | 706/21 |
| 7,072,841 | B1 * | 7/2006 | Pednault | 705/4 |
| 7,165,037 | B2 * | 1/2007 | Lazarus et al. | 705/7.31 |
| 7,171,340 | B2 | 1/2007 | Brocklebank | |
| 7,213,031 | B1 * | 5/2007 | Savoie et al. | 1/1 |
| 7,246,083 | B2 * | 7/2007 | Bibelnieks et al. | 705/14.43 |
| 7,272,575 | B2 * | 9/2007 | Vega | 705/80 |
| 7,283,982 | B2 * | 10/2007 | Pednault | 706/12 |
| 7,305,364 | B2 * | 12/2007 | Nabe et al. | 705/37 |
| 7,328,201 | B2 | 2/2008 | D'Ambrosio | |

(Continued)

OTHER PUBLICATIONS

Madeira, S. et al., Comparison of target selection methods in direct marketing, European Symposium on Intelligent Technologies, Hybrid Systems and their implementation on Smart Adaptive Systems, 2002.*

(Continued)

*Primary Examiner* — Scott L Jarrett
(74) *Attorney, Agent, or Firm* — Howard IP Law Group, PC

(57) ABSTRACT

A computer system selects prospects for insurance policy marketing activities. The computer system stores at least one equation that defines a predictive model responsive to a plurality of independent variables and a plurality of parameters and having an associated error component. The error component includes a spatio-temporal error component. The computer system also evaluates the parameters in order to parameterize the predictive model in such a way as to reduce the error component. Further, the computer system applies the parameterized predictive model to a data set that represents a universe of potential prospects for insurance marketing activities. Still further, the computer system generates a list of selected prospects, based on results of applying the parameterized predictive model to the data set. The list of selected prospects represents a subset of the universe of potential prospects. The computer system also outputs the list of prospective prospects.

19 Claims, 10 Drawing Sheets

(56) References Cited

U.S. PATENT DOCUMENTS

| | | | |
|---|---|---|---|
| 7,370,002 B2* | 5/2008 | Heckerman et al. | 705/14.41 |
| 7,403,904 B2* | 7/2008 | Abe et al. | 705/7.29 |
| 7,451,065 B2* | 11/2008 | Pednault et al. | 703/2 |
| 7,472,072 B2* | 12/2008 | Kowalchuk | 705/7.32 |
| 7,499,897 B2* | 3/2009 | Pinto et al. | 706/46 |
| 7,533,038 B2* | 5/2009 | Blume et al. | 705/7.31 |
| 7,561,158 B2* | 7/2009 | Abe et al. | 345/440 |
| 7,707,049 B2* | 4/2010 | Van Cleave et al. | 705/4 |
| 7,707,051 B2* | 4/2010 | Pankey et al. | 705/4 |
| 7,711,599 B1* | 5/2010 | Libman | 705/14.17 |
| 7,711,734 B2* | 5/2010 | Leonard | 707/736 |
| 7,725,300 B2* | 5/2010 | Pinto et al. | 703/2 |
| 7,725,415 B2* | 5/2010 | Hale et al. | 706/46 |
| 7,730,003 B2* | 6/2010 | Pinto et al. | 706/21 |
| 7,856,375 B2* | 12/2010 | Libman | 705/14.17 |
| 7,877,346 B2* | 1/2011 | Karty | 706/62 |
| 7,933,762 B2* | 4/2011 | Pinto et al. | 703/22 |
| 7,945,497 B2* | 5/2011 | Kenefick et al. | 705/35 |
| 8,027,871 B2* | 9/2011 | Williams et al. | 705/7.31 |
| 8,032,473 B2* | 10/2011 | Rice | 706/46 |
| 8,065,169 B1* | 11/2011 | Oldham et al. | 705/4 |
| 8,355,934 B2* | 1/2013 | Virdhagriswaran | 705/4 |
| 2001/0027408 A1* | 10/2001 | Nakisa | 705/10 |
| 2002/0194050 A1* | 12/2002 | Nabe et al. | 705/10 |
| 2004/0015386 A1* | 1/2004 | Abe et al. | 705/10 |
| 2004/0024608 A1* | 2/2004 | Saenz et al. | 705/1 |
| 2004/0059626 A1 | 3/2004 | Smallwood | |
| 2004/0138958 A1* | 7/2004 | Watarai et al. | 705/26 |
| 2005/0010472 A1* | 1/2005 | Quatse et al. | 705/14 |
| 2005/0033723 A1* | 2/2005 | Selby et al. | 707/1 |
| 2005/0234763 A1 | 10/2005 | Pinto et al. | |
| 2007/0226158 A1 | 9/2007 | Woronow et al. | |
| 2007/0260521 A1* | 11/2007 | Van Der Riet | 705/14 |
| 2008/0005104 A1 | 1/2008 | Flake et al. | |
| 2008/0154651 A1* | 6/2008 | Kenefick et al. | 705/4 |
| 2009/0132347 A1* | 5/2009 | Anderson et al. | 705/10 |
| 2010/0057548 A1* | 3/2010 | Edwards | 705/14.13 |
| 2010/0318484 A1* | 12/2010 | Huberman et al. | 706/46 |

OTHER PUBLICATIONS van der Putten, Peter, Data Mining in Direct Marketing Databases. Complexity and Management : A Collection of Essays. World Scientific Publishers, 1999.*

Ou, Chuangxin et al., On Data Mining for Direct Marketing RSFDGrC'03 Proceedings of the 9th international conference on Rough sets, fuzzy sets, data mining, and granular computing, 2003.*

Roberts, Mary Lou et al., Direct Marketing Management—Secon Edition Prentice Hall, 1999.*

Allenby, Greg M. et al., Hiearchical Bayesian Models: A practitioners guide Jan. 2005.*

Arab, A., et al. Hierarchical Spatial Models. Encyclopedia of Geographical Information Science, Springer, 2007.*

Cui, Geng et al., Machine Learning for Direct Marketing Response Models: Bayesian Networks with Evolutionary programming, Management Science, vol. 52, No. 4, Apr. 2006.* van der Putten, Peter et al., CoIL Challenge 2000 Tasks and Results: Predicting and Explaining Caravan Policy Ownership 2000.*

Bozza, S., Bozza S. A Bayesian estimation of a separable spatio-temporal model with autoregressive temporal component, Italian Statistics Society, University of Milano, ISBN 9788871785899.*

A Hierarchical Bayesian Approach to Predicting Retail Customers Share of Wallet Loyalty Southern Methodist University, Nov. 2006.*

Wikle, Christopher K., Hierarchical Models in Environmental Science International Statistics Review, Jul. 2002.*

Wikle, Christopher K., Hiearchical Bayesian Spatial-Temporal Models for Population Spread Applications of Computational Statistics in the Environmental Sciences: Hierarchical Bayes and MCMC Methods, Mar. 2005.*

Spiegelhalter, David et al., Winbugs User Manual version 1.4 Jan. 2003.*

Introduction to Winbugs Aug. 27, 2004.*

Xu, Ke et al., Estimation of Paramterization of spatio-temporal dynamic models Journal of Statistical Plannign and Inference, vol. 137, 2007.*

Bayesian Inference Techniques—Chapter 8 Adaptive Learning of Polynomial Networks Genetic and Evolutionary Computation, 2006.* van Geloven, Sjoerd, Intelligent Target Selection for Direct Marketing Apr. 25, 2002.*

Nyce, Charles, Predictive Analytics White Paper American Institute for CPCU/Insurance Institute of America, 2007.*

Moore, B.D., Direct Marketing of Insurance Integration of Marketing, Pricing and Underwriting Discussion Paper Program, Casualty Acturial Society, 1998.*

Yan, Jun et al., Staying Ahead of the Analytical Competitive Curve: Integrating the Broad Range Applications of Predictive Modeling in a Competitive Market, Casualty Acturial Society E-Forum, Winter 2008.*

Special Report: How to Use Predictive Modeling to Pick Your Best ROI up to 172% MarketingSherpa, May 20, 2008.*

Tode, Chantal, New Prospecting Methods Help Pinpoint Ideal Consumers Deliver Magazine, Jan. 10, 2011.*

Tirenni, Giuliano et al., Applying decision trees for value-based customer relations management: Predicting airline customers future value, Direct Marketing & Customer Strategy Management, vol. 14, No. 2, 2007.*

Shih, Ya-Yueh, et al., A method for customer lifetime value ranking—Combining the analytics hierarchy process and clustering analysis, Database Marketing & Customer Strategy Management, vol. 11, No. 2, 2003.*

Siegel, Eric, Predict Analytics with Data Mining: How It Works PredictionImpact.com, Feb. 2005.*

Speer, Pat, Amica Life Takes Better Aim Insurance Markeing News, Sep. 2005.*

Business Intelligence solutions: Not all Predictive Analytic tools are born equal Business-Insight.com, Jun. 11, 2011.*

Siegel, Eric, Driven with Business Expertise, Analytics Produces Actionable Predictions DestinationCRM, Mar. 29, 2004.*

Hughes, Arthur Middleton, Customer Acqusition & Modeling KnowledgeBase Marketing, Mar. 2010.*

Chou, Paul B. et al., Identifying Prospective Customers ACM, KDD, 2000.*

Cabena, Peter et al., Intelligent Miner for Data Applications Guide IBM Redbook, SG24-5252-00, Mar. 1999.*

Apte, C.V. et al., A probabilistic estimation framework for predict modeling analytics IBM Systems Journal, vol. 41, No. 3, 2002.*

Tanser, James, Non-traditional applications of predictive modeling CAS Seminar on Predictive Modeling, Watson Wyatt Worldwide, 2005.*

Mmoon, Sangkil et al., A Spatial Choice Model for Product Recommendations University of Iowa, Jan. 2003.*

Dion, Mark S., Predictive Modeling: Is it a Game Changer Refelections, vol. 27, Fall 2012.*

Duncan, Anderson, Modeling Policyholder Retention CAS Seminar on Predictive Modeling, Watson Wyatt Worldwide, 2006.*

Noel Cressie and Hsin-Cheng Huang, "Classes of Nonseparable, Spatio-Temporal Stationary Covariance Functions", Journal of the American Statistical Association, vol. 94, No. 448 (Dec. 1999), (pp. 1330-1340, 12 pages total).

Brian J. Smith and Jocab J. Oleson, "Geostatistical Hierarchical Model for Temporally Integrated Radon Measurements", American Statistical Association and the Internation Biometric Society, Journal of Agricultural, Biological, and Environmental Statistics, vol. 13, No. 2, 2008, DOI: 10.1198/108571108X312896, (pp. 140-158, 19 pages total).

Tilmann Gneiting, "Nonseparable, Stationary Covariance Functions for Space-Time Data", Journal of the American Statistical Association, vol. 97, No. 458, (Jun. 2002), (pp. 590-600, 12 pages total).

Mary Kathryn Cowles et al., "Reparametrized and Marginalized Posterior and Predictive Sampling for Complex Bayesian Geostatistical Models", Nov. 19, 2007, (abstract 1+ Introduction pp. 2-24, 24 pages total).

Jun Yan et al., "Parallelizing MCMC for Bayesian Spatiotemporal Geostatistical Models", Oct. 24, 2006, Department of Statistical and Actuarial Science, (cover 1+ Abstract 1+ Introduction pp. 1-22, 24 pages total).

Andrew Gelman, "Prior distributions for variance parameters in hierarchical models", International Society for Bayesian Analysis (2006), vol. 1, No. 3, (pp. 515-533, 19 pages total).

Mark Philip Shipman, U.S. Appl. No. 12/209,437, entitled "System and Method for Representing Inconsistently Formatted Data Sets", filed Sep. 12, 2008.

* cited by examiner

| PROSPECT ID 902 | X01 904 | 908 | X15 906 | LATITUDE 910 | LONGITUDE 912 | TIME 914 | PREDICTED PREMIUM 916 |
|---|---|---|---|---|---|---|---|
| 111222333 | 4.05 | • | 8.12 | 34.84167 | 11.26008 | 2.5 | 11.87500 |
| 222333444 | 3.42 | • | 6.39 | 33.50087 | 12.93822 | 3.2 | 11.33169 |
| • | • | • | • | • | • | • | • |
| • | • |  | • | • | • | • | • |
| • | • |  | • | • | • | • | • |
| 333444555 | 2.31 |  | 7.23 | 4.79043 | 77.39095 | 1.7 | 10.66261 |
| 444555666 | 2.75 |  | 5.81 | 14.95386 | 53.03652 | 4.1 | 10.65746 |
| • | • |  | • | • | • | • | • |
| • | • |  | • | • | • | • | • |
| • | • |  | • | • | • | • | • |

SYSTEM AND METHOD FOR DIRECT MAILING INSURANCE SOLICITATIONS UTILIZING HIERARCHICAL BAYESIAN INFERENCE FOR PROSPECT SELECTION

FIELD

The present invention relates to computerized marketing activities with respect to insurance policies.

BACKGROUND

It is known to employ statistical methods to select the most promising marketing prospects from a universe of potential prospects for marketing of insurance products. For insurance operations in the United States, the number of potential prospects numbers in the hundreds of millions. There are typically limited budgets for insurance companies, so that there is a great need to limit the scope of marketing activities to those prospects who are most likely to become profitable customers. Computer models have been developed for the purpose of trying to identify the most promising prospects from among a large group of potential prospects.

The present inventor has recognized that there are certain statistical techniques, not heretofore applied to insurance marketing, that may produce more accurate predictions than conventional models with respect to the desirability of prospects for insurance marketing.

SUMMARY

An apparatus, method, computer system and computer-readable data storage medium are disclosed which include storing an equation or equations that collectively define a predictive model responsive to a number of independent variables and a number of parameters, and having an associated error component. The error component includes a spatial error component. The apparatus, method, computer system and computer-readable data storage medium also include evaluating the parameters in order to parameterize the predictive model in such a way as to reduce the error component. The apparatus, method, computer system and computer-readable data storage medium also include applying the parameterized predictive model to a data set which represents a universe of potential prospects for insurance marketing activities. Further, the apparatus, method, computer system and computer-readable data storage medium include generating a list of selected prospects, based on results of applying the parameterized predictive model to the data set. The list of selected prospects represents a subset of the universe of potential prospects. In addition, the apparatus, method, computer system and computer-readable data storage medium include outputting the list of selected prospects.

In this manner, a predictive model of this type may be more effective in predicting potential revenue opportunities or desirability of potential prospects than conventional models.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIG. 9 is a table that illustrates data for a simulated data set of potential prospects that have been scored and ranked by the computer of FIG. 2 using the predictive model of FIG. 4.

DETAILED DESCRIPTION

In general, and for the purposes of introducing concepts of embodiments of the present invention, a predictive model for selecting insurance marketing prospects employs hierarchical Bayesian inference and includes a spatio-temporal structured error component. After training on a sample data set, the model is used to score/rank potential prospects from a large universe of potential prospects. The highest ranking/scoring prospects are selected to be recipients of marketing activities such as dispatching of direct mailings.

The spatio-temporal structured error component associated with the predictive model may result in better fitting of the model to the data used to train the model, and therefore may result in more accurate prediction than with models that lack a spatio-temporal structured error component. Further, the resulting predictive model may be more robust than conventional models in the face of the passage of time and/or occurrence of events that may potentially disrupt the behavior of insurance marketing prospects.

Figure 1:
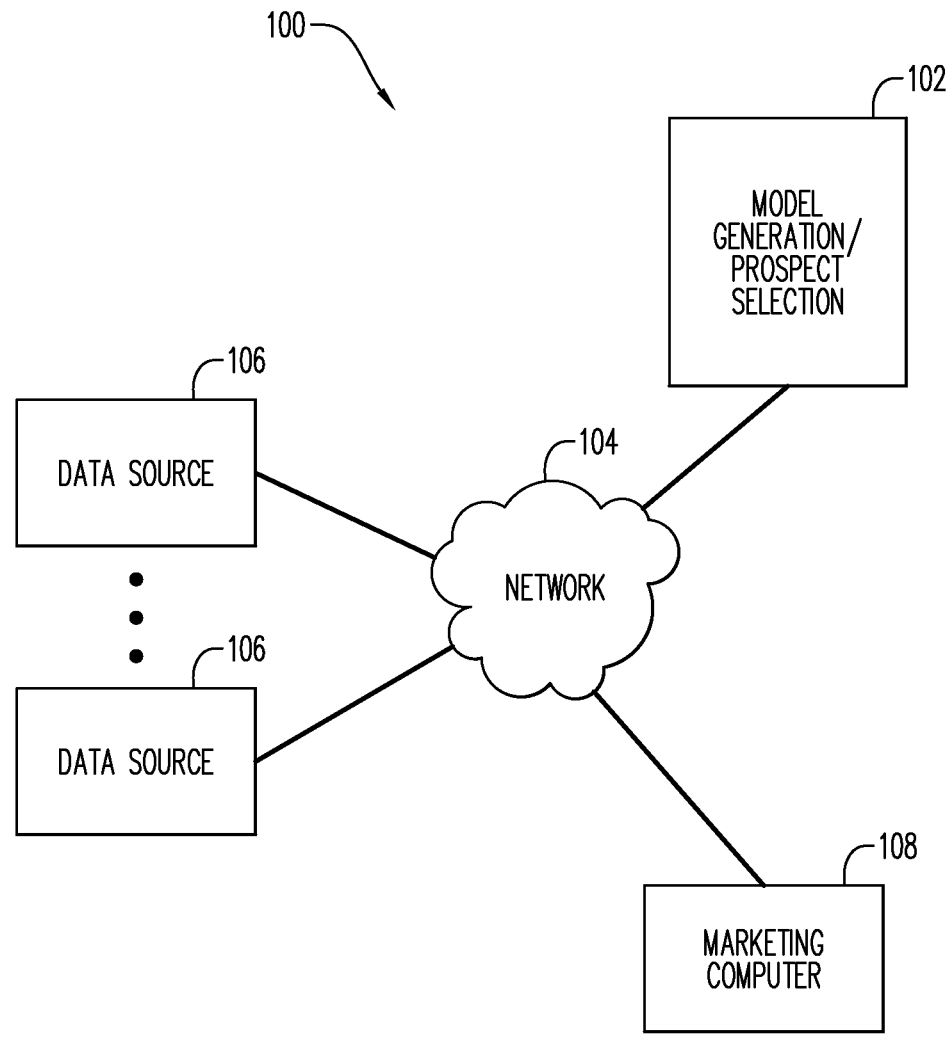
FIG. 1 is a block diagram of a system provided according to aspects of the present invention.

FIG. 1 is a block diagram of a system 100 provided according to aspects of the present invention. The system 100 includes a computer 102 that may be operated by an insurance company to train a predictive model and apply the model to the task of selecting prospects to be recipients of marketing activities (hereinafter the computer 102 will be referred to as a "model generation and prospect selection computer").

The system 100 also includes a conventional data communication network 104 to which the model generation and prospect selection computer 102 is coupled. The data communication network 104 may for example include one or both of a public data communication network such as the Internet and one or more private data communication networks. Also shown in FIG. 1 as being connected to the data communication network 104 are various sources 106 of data to be used in training and/or applying the predictive model implemented with the model generation and prospect selection computer 102. Each block 106 should be understood to include one or more computers that supply data to the model generation and prospect selection computer 102. Example data sources may include, for example, R.L. Polk & Co. and InfoBase. Another example data source may be a contractor retained by the insurance company to store marketing data or the like for the insurance company.

Also coupled to the data communication network 104 is another computer (represented by block 108), which is also operated by or on behalf of the insurance company. The computer 108 (also referred to as a "marketing computer") may operate in a conventional manner to dispatch marketing offers to lists of prospects selected by the model generation and prospect selection computer 102.

Figure 2:
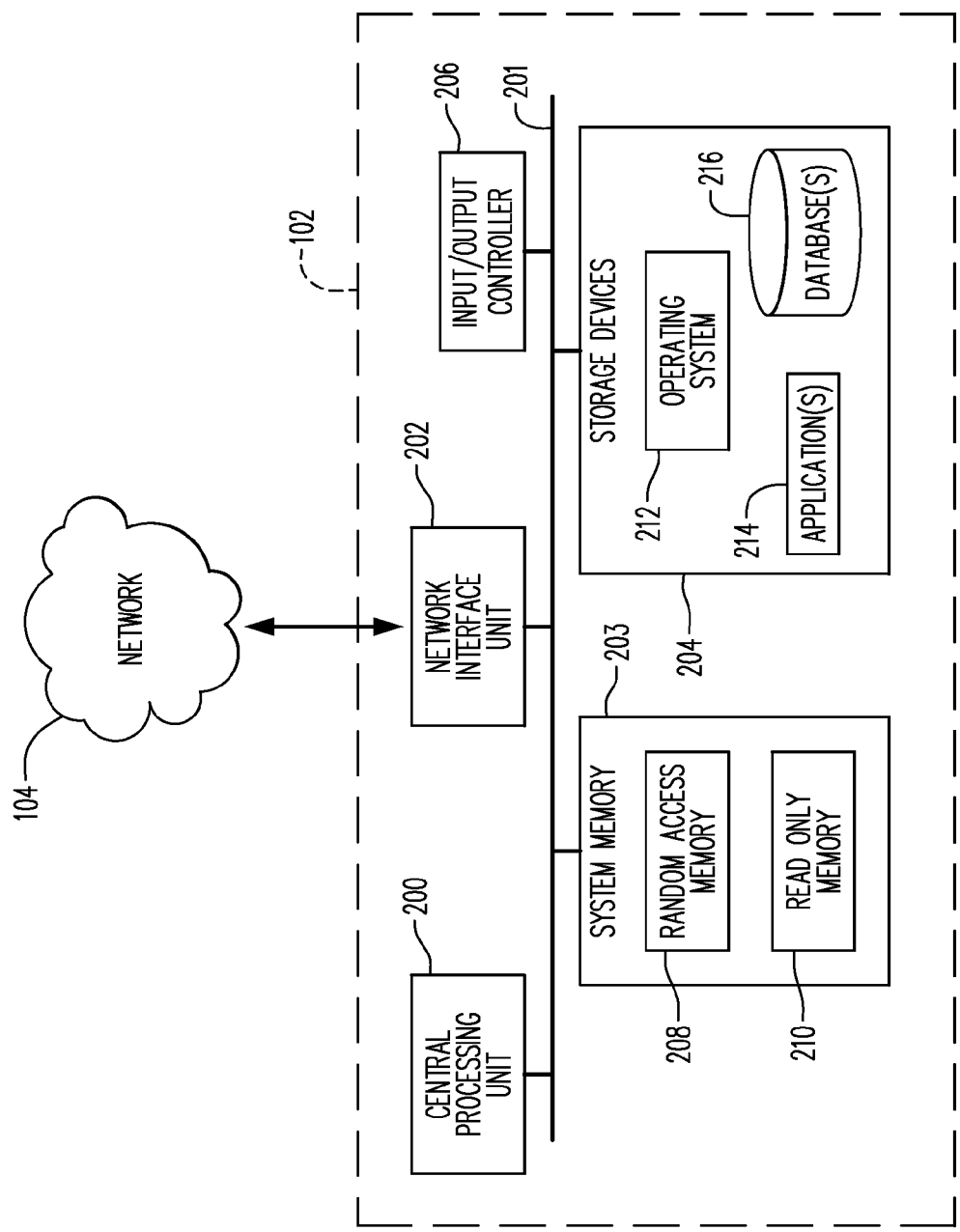
FIG. 2 is a block diagram representation of a computer that is part of the system of FIG. 1.

FIG. 2 is a block diagram representation of the model generation and prospect selection computer 102 shown in FIG. 1. The model generation and prospect selection computer 102 may be conventional in terms of its hardware aspects.

As depicted in FIG. 2, the model generation and prospect selection computer 102 includes a data bus 201. The model generation and prospect selection computer 102 also includes a computer processor (CPU) 200 which is operatively coupled to the data bus 201 and which may be constituted by one or more conventional processors. The model generation and prospect selection computer 102 further includes a network interface unit 202, system memory 203, one or more storage devices 204, and an input/output controller 206, all of which are also operatively coupled to the data bus 201.

The network interface unit 202 may function to facilitate communication with, for example, other devices (such as computers shown as elements 106 and 108 in FIG. 1). The input/output controller 206 may couple the model generation and prospect selection computer 102 to input and output devices (not shown) such as a keyboard, a keypad, a mouse or other pointing device, a microphone, knob or a switch, an infra-red (IR) port, a docking station, a touch screen, a display (e.g., a display screen), a speaker, and/or a printer.

The system memory 203 may be constituted by, for example, a suitable combination of Random Access Memory (RAM) devices 208 and Read Only Memory (ROM) devices 210.

Storage devices 204 may comprise any appropriate information storage device, including combinations of magnetic storage devices (e.g., magnetic tape and hard disk drives), optical storage devices, and/or semiconductor memory devices. At least some of these devices (and/or all or part of the system memory 203) may be considered computer-readable storage media, or may include such media.

Storage devices 204 store one or more programs (at least some of which being indicated by blocks 212, 214) for controlling CPU 200. CPU 200 performs instructions of the programs, and thereby operates in accordance with aspects of the present invention. In some embodiments, the programs may include one or more conventional operating systems, indicated by block 212 in FIG. 2. The programs may further include application programs (block 214) such as a conventional data communication program and a conventional database management program. Still further the application programs may include software for building, specifying and applying a predictive model in accordance with aspects of the present invention. The modeling program itself may be conventional, but may be configured in a novel manner so as to build a predictive model having characteristics as disclosed herein.

There may also be stored in the storage devices 204 other software, such as device drivers, website hosting software, etc.

Still further, the storage devices 204 may store one or more databases (block 216) for storing and managing the data used in training and application of the predictive model described below.

Further, the databases 216 may include other databases that are utilized in the operation of the model generation and prospect selection computer 102.

Figure 3:
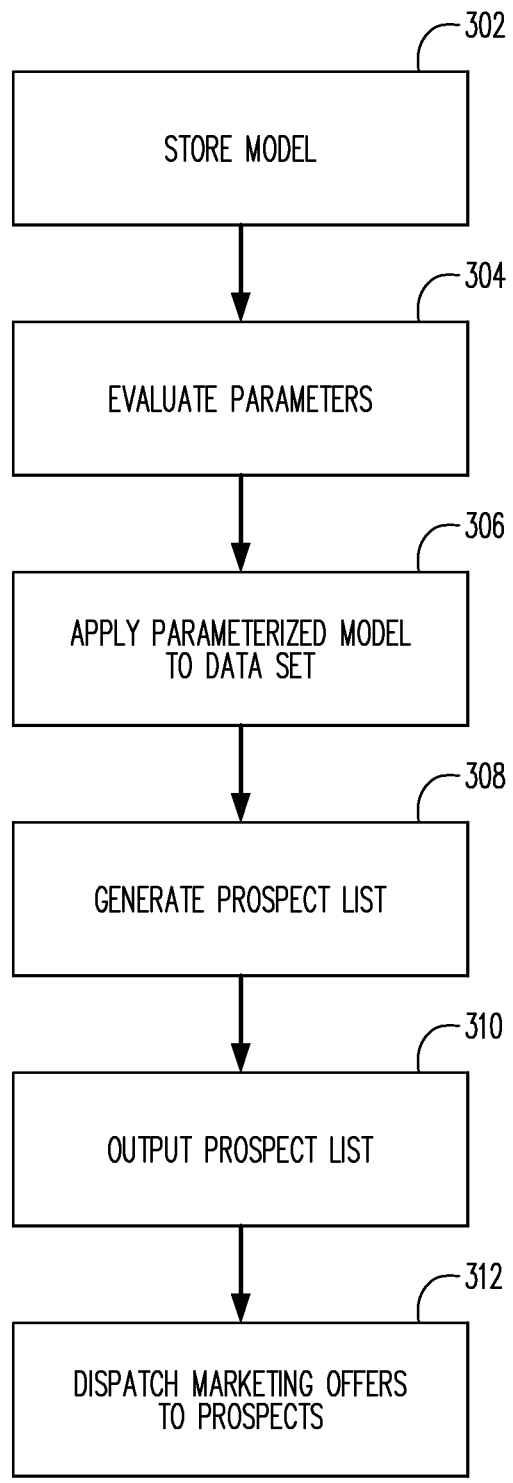
FIG. 3 is a flow chart that illustrates a process that may be performed in accordance with aspects of the present invention by the computer depicted in FIG. 2.

FIG. 3 is a flow chart that illustrates a process that may be performed in accordance with aspects of the present invention by the model generation and prospect selection computer 102.

Figure 4:
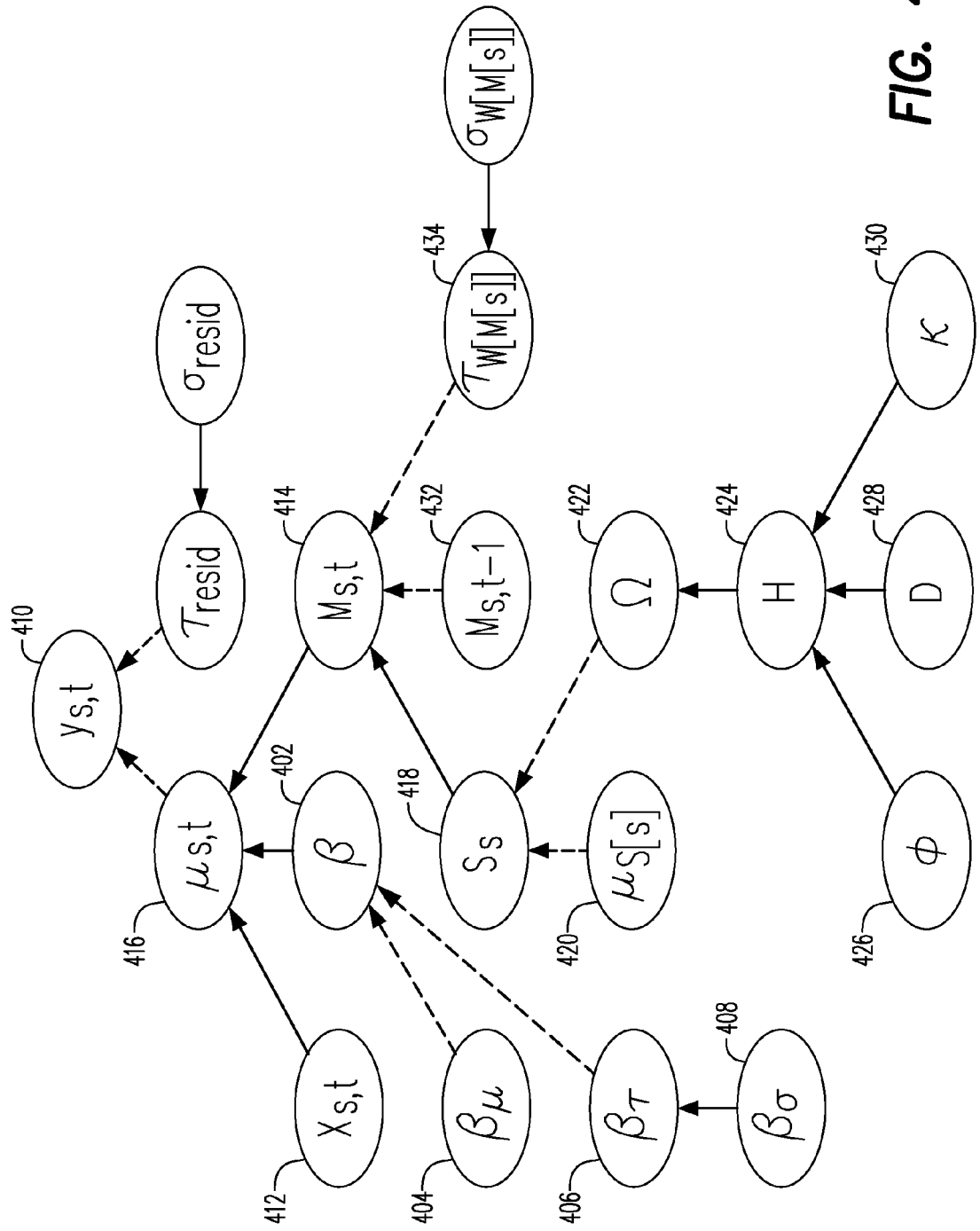
FIG. 4 is Directed Acyclic Graph (DAG) that represents a predictive model that may be employed, in accordance with aspects of the present invention, in the process of FIG. 3.

At 302 in FIG. 3, the model generation and prospect selection computer 102 stores one or more equations that define a predictive model. FIG. 4 is Directed Acyclic Graph (DAG) that represents an example of a predictive model that may be defined by the equations, in accordance with aspects of the present invention. The meaning of the DAG of FIG. 4 will be explained below in conjunction with a discussion of mathematical notation and of particular equations by which the example predictive model may be defined. Prior to that discussion, however, there will first be a brief explanation of the format of DAGs.

A DAG is formed by a collection of vertices (represented by ovals in FIG. 4) and directed edges (represented by arrows in FIG. 4), with each edge connecting one vertex to another, and the connections among vertices formed such that there is no path by which it is possible to start at a given vertex and follow a sequence of edges so as to return to the vertex in question. In the format shown in FIG. 4, solid line arrows indicate deterministic dependence of one vertex on another, and dashed line arrows indicate stochastic dependence of one vertex on another.

One common form of statistical equations is illustrated below:

$$y_i = \beta_0 + \beta_1 x_{1,i} + \epsilon_i$$

$$\epsilon_i \sim N(0, \sigma^2) \quad \text{(Eq. 1)}$$

Equation 1 indicates that y is the dependent variable, and record i is equal to a linear additive function of a parameter called the intercept ($\beta_0$), a parameter ($\beta_1$) times an independent variable ($x_{1,1}$) indexed to record i, and a residual ($\epsilon$) for record i. The residual (which is also sometimes referred to as the "error"), is assumed to be normally distributed (N), with a mean of zero and a certain variance ($\sigma^2$), where normal distributions are characterized by two parameters: mean and variance. The ~ symbol indicates that $\epsilon_i$ is stochastic rather than deterministic. A stochastic process includes an element of randomness, and since a variety of outcomes may exist due to the uncertainty associated with randomness, the uncertainty is represented with a probability distribution.

One goal of fitting a model to data is to minimize the variance of the residual. Estimating a model may involve solving for the optimal parameter estimates of $\beta_0$ and $\beta_1$ that decrease $\sigma^2$, given the data.

The following notation is equivalent to Equation 1.

$$y_i \sim N(\mu_i, \tau^{-1})$$

$$\mu_i = \beta_0 + \beta_1 x_{1,i} \quad \text{(Eq. 2)}$$

Equation 2 is a more common notation in Bayesian literature. Here, y is normally distributed according to $\mu$ and $\tau^{-1}$, where $\tau$ is the residual precision, and the precision is equal to the inverse of the variance ($1/\sigma^2$). The residual precision is stochastic and gamma-distributed or half-Cauchy distributed. In example embodiments of the invention, half-Cauchy distribution is employed for the residual precision. In addition, in example embodiments, Bayesian inference is used in building the model, so the notation employed in FIG. 4 and in subsequent discussion will be of the same type illustrated by Equation 2.

In traditional frequentist inference, $\beta_0$ and $\beta_1$ would be constants. There would be one optimal value for each parameter. However, when Bayesian inference is used, each parameter consists of a distribution, rather than merely a single, fixed point-estimate. Bayesian inference involves a full probability model, while frequentist inference does not.

Bayesian inference includes prior probability distributions that combine with the data or the likelihood, and Markov chain Monte Carlo (MCMC) algorithms are used to sample from the final desired result, being the marginal posterior distributions. Each prior probability distribution may in turn depend on other parameters that are not included directly in the model likelihood. In this case, a prior is specified for a parameter of another prior. A prior of a prior is called a hyperprior. This hierarchical structure of estimation is called hierarchical Bayesian inference.

In non-hierarchical Bayesian inference, each $\beta$ (parameter) is usually specified as normally distributed with zero mean and a low precision, such as 1.0E-4. In hierarchical Bayesian inference, each $\beta$ (vertex 402, FIG. 4) is usually specified as normally distributed with mean $\beta_\mu$ (vertex 404, FIG. 4) and precision $\beta_\tau$, (vertex 406, FIG. 4) and $\beta_\mu$ is specified as normally distributed with zero mean and a low precision, while $\beta_\tau$ is commonly specified as gamma-distributed with parameters (0.01, 0.01), for example. (Vertex 408 in FIG. 4 represents the variance of the parameter.)

Equation 2 is one of many forms of statistical equations, and may be generalized to fit a variety of types of models. The example shown in Equation 2 may be appropriate for modeling a dependent variable that is continuous, unbounded, and does not require a link function. However, if the dependent variable is discrete (e.g., taking a value of either one or zero, or another countable number of values, which may correspond to "yes or no", or the like), then a link function is required. In such a case, the equations which define a model may be in the following form:

$$y_i \sim \text{Bern}(p_i) \quad \text{(Eq. 3a)}$$

$$p_i = e^{\mu[i]}/(e^{\mu[i]}+1) \quad \text{(Eq. 3b)}$$

$$\mu_i = \beta_0 + \beta_1 x_{1,i} + \epsilon_i \quad \text{(Eq. 3c)}$$

In this example, y (the value of the dependent variable) for record i is Bernoulli-distributed according to probability p for record i. Equation 3b is a logit link function, which converts $\mu_i$ from a continuous and unbounded linear combination of $\beta$, $x_1$ and $\epsilon$ into a probability that ranges between zero and one, indicating the probability that the record i has the attribute represented by y.

A variety of link functions exists and may be useful for a variety of purposes. For example, there are link functions having unified linear regression, logistic regression, and Poisson regression under the framework of Generalized Linear Models (GLM).

The example models represented in Equations 1-3 are "univariate" in that they have only one dependent variable. Other types of models, referred to as "multivariate", have more than one dependent variable, and can be built by correcting for correlated errors between the equations associated with the multiple dependent variables.

Further, in the notation shown in Equations 1-3, there is a single independent variable x (or $x_i$), which is not boldfaced. In alternative notation, however, a matrix of independent variables may be represented by X (boldfaced). In such notation, $\beta$ represents a vector of parameter estimates for the design matrix X. Moreover, according to convention, X $\beta$ indicates an inner product, using matrix algebra of X and $\beta$. Consider an example model with 10 independent variables, each with one of k parameter estimates $\beta_k$. The deterministic part of the likelihood definition for a simple linear regression model could be written as:

$$\mu_i = \beta_0 + \beta_1 x_{1,i} + \beta_2 x_{2,i} + \beta_3 x_{3,i} \ldots + \beta_{10} x_{10,i} \quad \text{(Eq. 4a)}$$

or equivalently $$\mu_i = x_i \beta \quad \text{(Eq. 4b)}$$

or more usually $$\mu = x\beta \quad \text{(Eq. 4c)}$$

Henceforth in this disclosure, the notation indicated in Equation 4b will generally be used.

The discussion will now turn to an example predictive model (hereinafter, the "Model") provided in accordance with aspects of the present invention, as illustrated in FIG. 4. The general additive form of the observation equation for the Model is as follows:

$$y_{s,t} \sim N(\mu_{s,t}, \tau^{-1})$$

$$\mu_{s,t} = X_{s,t}\beta + M_{s,t} \quad \text{(Eq. 5)}$$

Here, y (vertex 410, FIG. 4) is the dependent variable at space (location) s and time t. These subscripts similarly apply to the design matrix X (vertex 412). The space-time structure of the model is encapsulated in matrix M (vertex 414), which represents a spatio-temporal structured error component in the Model. M is a matrix of parameter estimates in which rows are points in space s and columns are time-periods t. Matrix M is a matrix of estimated effects for space-time events. (Matrix M is named after Hermann Minkowski, who was the first to explicitly and mathematically propose space and time as non-separable. $\mu_{s,t}$ is represented by vertex 416 in FIG. 4)

The structure of the space component in the Model is commonly used in Bayesian Gaussian kriging models, measures distances between sets of coordinates, and in this particular form assumes isotropy. (Generally, kriging is a point-referenced group of geostatistical techniques for interpolating values of a variable at unobserved points in space with different coordinates in a sample space due to observed values at other points in space in the sample space.)

The form of the space component in an example embodiment of the Model is:

$$S_s \sim MVN(\mu_{S[s]}, \Omega)$$

$$\Omega = H^{-1}$$

$$H = \sigma^2_s e^{(-\phi D)^\kappa} \quad \text{(Eq. 6)}$$

The spatial effect S (vertex 418, FIG. 4) with each point in space s is multivariate-normally distributed according to the vector mean $\mu_{S[s]}$ (vertex 420) and precision matrix $\Omega$ (vertex 422). The precision matrix is the inverse of the covariance matrix H (vertex 424), which is a function of the spatial variance $\sigma^2_s$ multiplied by the exponent of negative $\phi_s$ (vertex 426) times distance D (vertex 428) between records i and j, and $-\phi D$ is exponentiated by $\kappa$ (vertex 430).

The parameter $\phi$ is the rate of decay in spatial correlation and covariance with distance. Larger values of $\phi$ are associated with faster decay. The prior probability distribution for $\phi$ is often specified as a uniform distribution between a minimum and maximum value, and spatial correlation is often plotted according to the specified minimum and maximum values to determine if the high and low bounds on spatial correlation are sensible for a given distance. In order to calculate spatial correlation rather than covariance, $\sigma^2_s$ is omitted from the calculation of H. It is advisable not to set the minimum value for $\phi$ too small, which would indicate spatial correlation that is too high at the maximum observed distance in the model data set. This could lead to model identifiability problems between $\phi$ and the overall mean $\mu_S$ of the spatial random variables for S.

The parameter $\kappa$ affects the distributional shape of the function for the spatial component, and is bound between 0 and 2, where 0 is no effect, 1 is exponential, and 2 is Gaussian. The parameter is usually deterministic and fixed to 1, which assumes an exponential distribution. However, a prior probability distribution for $\kappa$ may be specified as a uniform distribution between 0 and 2. It is advisable to allow this parameter to be stochastic only when there is good reason.

The discussion will now turn to the time component of $M_{s,t}$. In this regard, a dynamic time component is specified for each point in space s of spatial effect S regarding the dynamic movement of each s through T time-periods. The dynamic time component occurs outside of the observation equation, in what is called the state equation:

$$M_{s,t} \sim N(M_{s,t-1}, \tau_{w[M[s]]}^{-1})$$ (Eq. 7)

The dynamic time component allows the spatial effect S for each point in space s to become dynamic, evolving through time according to a Markov process with a random walk. This creates a spatial process that moves through time. The current state of dynamic parameter $M_{s,t}$ depends only on $M_{s,t-1}$ (vertex 432, FIG. 4), $\tau_{w[M[s]]}$ (vertex 434), and changes in spatial relationships of S between s and y. The marginal posterior distribution for the variance of each Markov process, $w_{M[s]}$, is often observed as part of the posterior summary, where $w_{M[s]} = \tau_{W[M[s]]}^{-1}$. This dynamic method is an example of Dynamic Linear Modeling (DLM).

A dynamic time component is very flexible, and is able to accommodate either univariate or multivariate forms, seasonality, trends, regime changes or structural shifts, lagged variables, interactions, and other features of time-series. Traditional frequentist approaches to time-series relied on transformations or differencing to ensure that stationarity assumptions were met. DLM's, however, seek to directly represent features of time-series—such as trend, seasonality, or regression effects—without using differencing. This may have advantages in interpreting regression relationships that might be obscured by differencing, and in treating time-series that are subject to abrupt discontinuities or shifts, the impact of which cannot be simply removed by differencing.

In the real world, space and time are non-separable. Changes in space are associated with changes in time, and vice versa. In statistical representations, space and time can be separable or non-separable, though separable space-time is usually chosen for convenience rather than as the best way to fit a model to data. Separable space-time models are limited because they do not model a space-time interaction. With separable space-time models, for any two points in space s, the cross-variance function between the same time periods at each spatial point always has the same shape.

In an example embodiment of the Model, space-time is non-separable, although it may be the case that no cross-variance function is defined explicitly. Nevertheless, the marginal posterior distribution for the variance of each Markov process $w_{M[s]}$ differs across points in space, and this can be studied along with the spatial variance $\sigma^2_s$ to determine if the condition of non-separability holds in a given data set.

There are a variety of ways to include space and time components, but in an example embodiment of the Model, space and time components are included in a way that represents actual space-time rather closely. For example, the Model kriges the spatial effect S at each point in space s, and S becomes the first column of M, while simultaneously, each point in space in M becomes dynamic, varying in time t according to a Markov process. Depending on the data set, some points in space may increase in M with time, other points may decrease in M with time, and other points may remain unaffected. It is therefore straightforward to demonstrate that in the Model space and time interact, and thus are non-separable, even without a cross-variance function being explicitly defined.

Each data record in a data set used by the Model may be an individual or household that is a potential prospect for receiving insurance marketing activities. To estimate the spatial component, the household level latitude and longitude of each record in the data set is compared to that of each other record, and a distance matrix is calculated. As a simplified example, assume a model data set with only three records. The distance between each of these records would be calculated and stored in a 3×3 matrix that will be called D, consisting of 3 rows and 3 columns. By definition, each position in distance matrix D with the same row and column number has zero distance. Therefore, D[1,1], meaning row number 1 and column number 1, is zero, as is D[2,2] and D[3,3]. Each record has zero distance to its own latitude and longitude. The other, off-diagonal entries of this matrix have a distance greater than zero, as long as the specific latitude and longitude coordinates differ between each record.

Distance may be calculated in a number of ways. For example, Euclidean distance may be calculated as follows:

$$D[i,j] = \text{sqrt}[(\text{Latitude}[i] - \text{Latitude}[j])^2 + (\text{Longitude}[i] - \text{Longitude}[j])^2]$$ (Eq. 8a)

Euclidean distance does not correct for the curvature of the Earth. An alternative distance measure—haversine distance—does correct for the curvature of the Earth. Haversine distance is calculated as follows:

$$D[i,j] = 2*R*\arcsin\{\text{sqrt}[\sin(\{[(\pi*\text{Latitude}[i])/180] - [(\pi*\text{Latitude}[j])/180]\}/2)^2 + \cos\{[(\pi*\text{Latitude}[i])/180]\}*\cos\{[(\pi*\text{Latitude}[j])/180]\}*\sin(\{[(\pi*\text{Longitude}[i])/180] - [(\pi*\text{Longitude}[j])/180]\}/2)^2]\}$$ (Eq. 8b), where R is the average radius in miles of the Earth (approximately 3,959 miles).

In example embodiments of the Model, either Euclidean or haversine distance is used. In other example embodiments, other distance measures may be used, such as those that include elevation above sea level, or drive-time distances.

In estimating the Model, the marginal posterior distributions for M vary according to space and time. To predict y at new points in space s that are unobserved within the time-periods in the data set, each s must be interpolated within the random field of latitude and longitude. This can be done directly in the Model, particularly if the number of predictions is not very large. Alternatively, however, and especially for a large number of predictions, M may be interpolated with a separate software package, given the marginal posterior distributions of the estimated Model.

To predict y at a time-period that is outside of the data set, the Model is used to forecast the points in space s in the data set to a future time-period t. Different points in space at this new time-period may be predicted in the Model, or another software package may be used. Once M is estimated, point-estimates of new, unobserved y's, called ynew in Bayesian literature, may be predicted according to the following equation:

$$ynew_{s,t} = X_{s,t}\beta_t M_{s,t} \quad \text{(Eq. 9)}$$

A fully Bayesian method of prediction entails posterior predictive distributions, in which each $ynew_{s,t}$ is sampled numerous times and may be represented in the end by a posterior average. The fully Bayesian method provides a superior estimate of $ynew_{s,t}$, because all of the distributional information is taken into account. However, in cases where it is necessary or desirable to limit the amount of time needed for predicting records, simple point-estimates of the posterior distributions may be used in Equation 9 to produce point-estimates for each $ynew_{s,t}$.

There are commercially available data sets that provide records for individuals/households with hundreds or even thousands of potential independent variables. In constructing the Model, conventional techniques may be employed to determine the predictive power of the potential independent variables and to reduce the number of independent variables to, say, 15 to 20 independent variables having the most predictive power.

In some embodiments of the Model, the dependent variable y may be the predicted insurance premium amount that would be paid by the potential prospect (individual or household). In an alternative embodiment, the dependent variable y may be discrete, with the alternative values representing a prediction that the prospect will fall into one of the categories "noncontinuation" (those who cancel the insurance policy within 90 days), "continuation" (those who cancel the policy within 90-360 days), and "renewal" (those who continue as policyholders beyond 360 days). In still other embodiments, the dependent variable is also discrete and is indicative of a prediction as to whether the potential prospect will respond to a direct mail solicitation. In other embodiments, the dependent variable indicates a degree of risk that the prospect would submit a claim under a policy written for the prospect.

In some embodiments, the Model is a hierarchical Bayesian mixed multinomial logit multilevel model and may be built using a publicly available software package such as WinBUGS. The multilevel component in the Model may allow all coefficients to vary by market segment. In some embodiments, precision parameters may be estimated with half-Cauchy prior distributions. Two random-effects error terms may be passed to a separate software package (e.g., the software package known as "R"), and each may be decomposed into the above-mentioned structured space-time (spatio-temporal) component and an unstructured error component. A hierarchical Bayesian space-time model may be built in "R" with the package known as "RAMPS" (Reparameterized And Marginalized Posterior Sampling). Latent space-time parameters may be assumed to follow a Gaussian distribution.

A frequentist fixed multinomial logit model may also be built in "R" for comparison purposes.

Referring again to FIG. 3, once the equations which define the Model have been stored in the model generation and prospect selection computer 102, then block 304 in FIG. 3 follows. At 304, the model generation and prospect selection computer 102 evaluates the parameters for the Model. For example, the insurance company may have compiled two or more years of policy premium data, marketing response data, policy renewal data and/or the like. This data may be divided into model training and validation samples, and may serve as observed records. Bayesian inference may be performed in a sufficient number of iterations using the model training data set until the posteriors of the parameters converge. As a result of this step 304, the Model is parameterized with the calculated values of the parameters.

Figure 5:
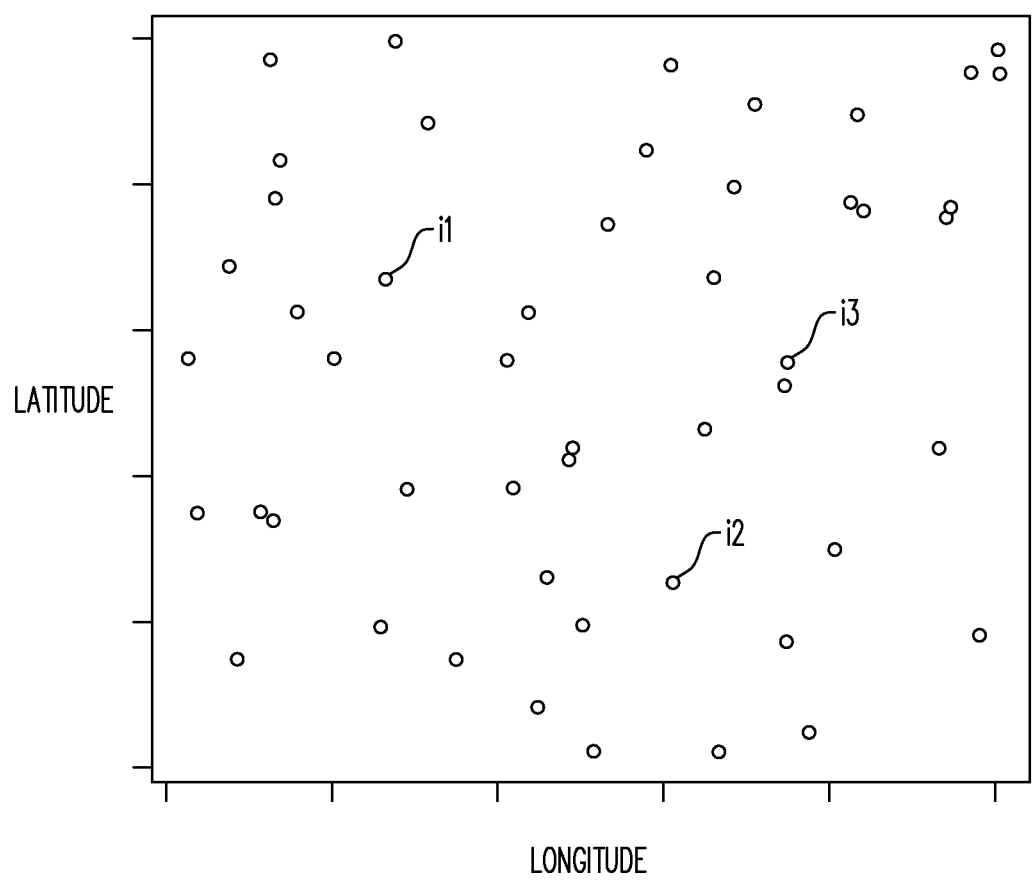
FIG. 5 is a plot of data records from a simulated data set of a type that may be used to train the predictive model of FIG. 4.

FIG. 5 is a plot of data records from a simulated data set of a type that may be used to train the Model. In the plot shown in FIG. 5, the data points are arrayed in a space defined by latitude and longitude. For example, each data point may represent a particular record i, such as the particular points labeled i1, i2 and i3 in FIG. 5. Each record may represent an individual or household included in the training data set. A location expressed in latitude and longitude is associated with each individual or household included in the training data set. The latitude and longitude may be expressed in normalized form as a decimal equivalent to an accuracy of one one-hundredth of a second of a degree of latitude/longitude.

Figure 6:
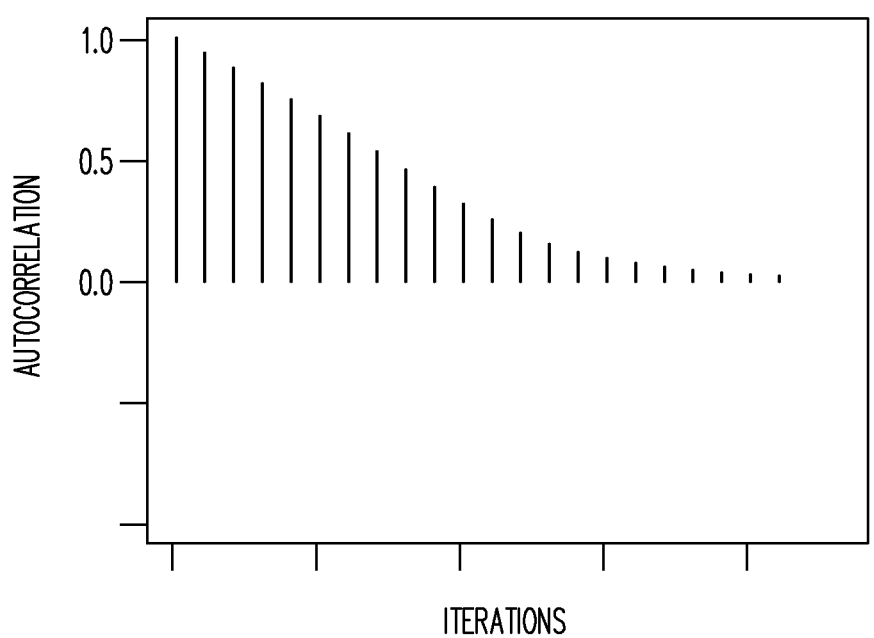
FIG. 6 is an autocorrelation plot of deviance over iterations of a Bayesian estimation process for the predictive model as trained with a simulated data set.

FIG. 6 is an autocorrelation plot of deviance over iterations of a Bayesian estimation process for the Model as trained with a simulated data set. An autocorrelation plot—like FIG. 6—may be used with other measures to determine whether convergence has occurred. In addition or alternatively, other measures of convergence may be used to determine convergence.

Figure 7:
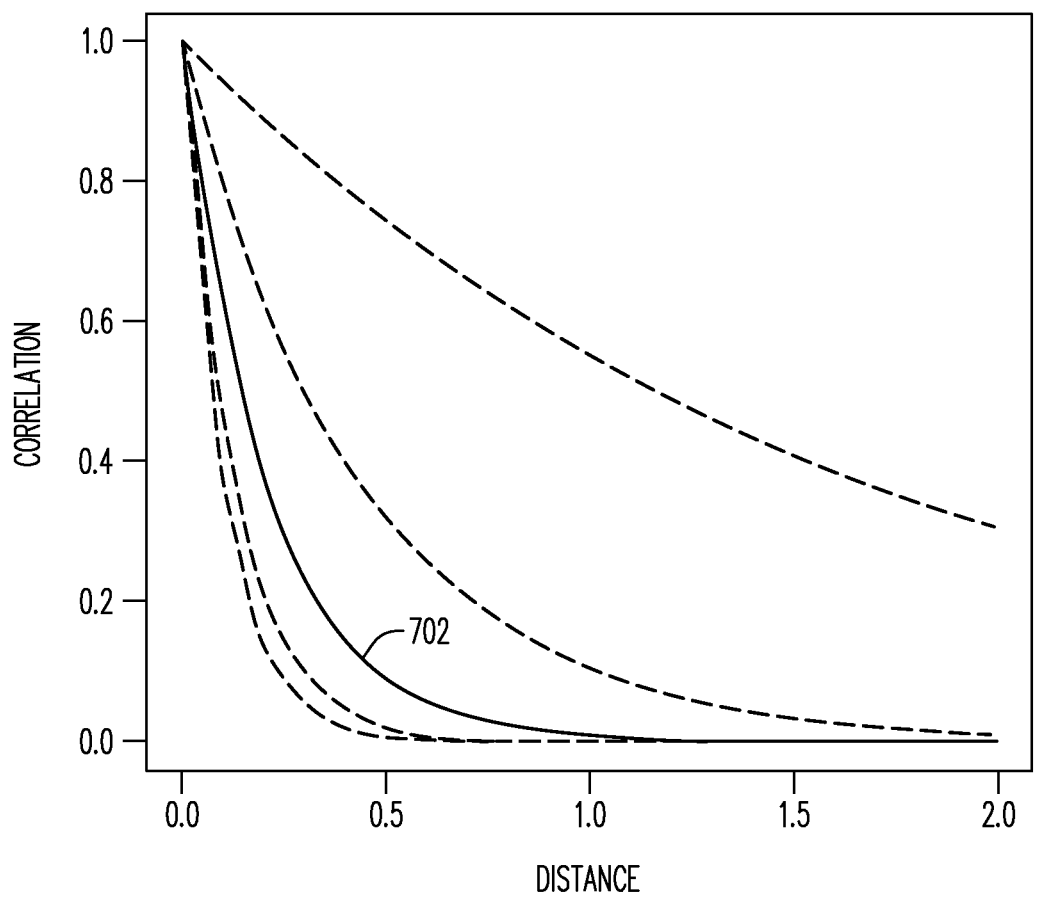
FIG. 7 is a plot that illustrates spatial correlation among data points in a simulated data set.

FIG. 7 is a plot that illustrates spatial correlation among data points in a simulated data set. In this simulated example plot, curve 702 shows the median, and the other (dashed line) curves show the 2.5%, 25%, 75% and 97.5% quantiles. For this simulated data set, spatial correlation is almost non-existent at distances of more than one degree of latitude/longitude. Low correlation (~0.33) occurs around a distance of 0.25 degree, and high correlation (~0.66) occurs around a distance of 0.125 degree.

Figure 8:
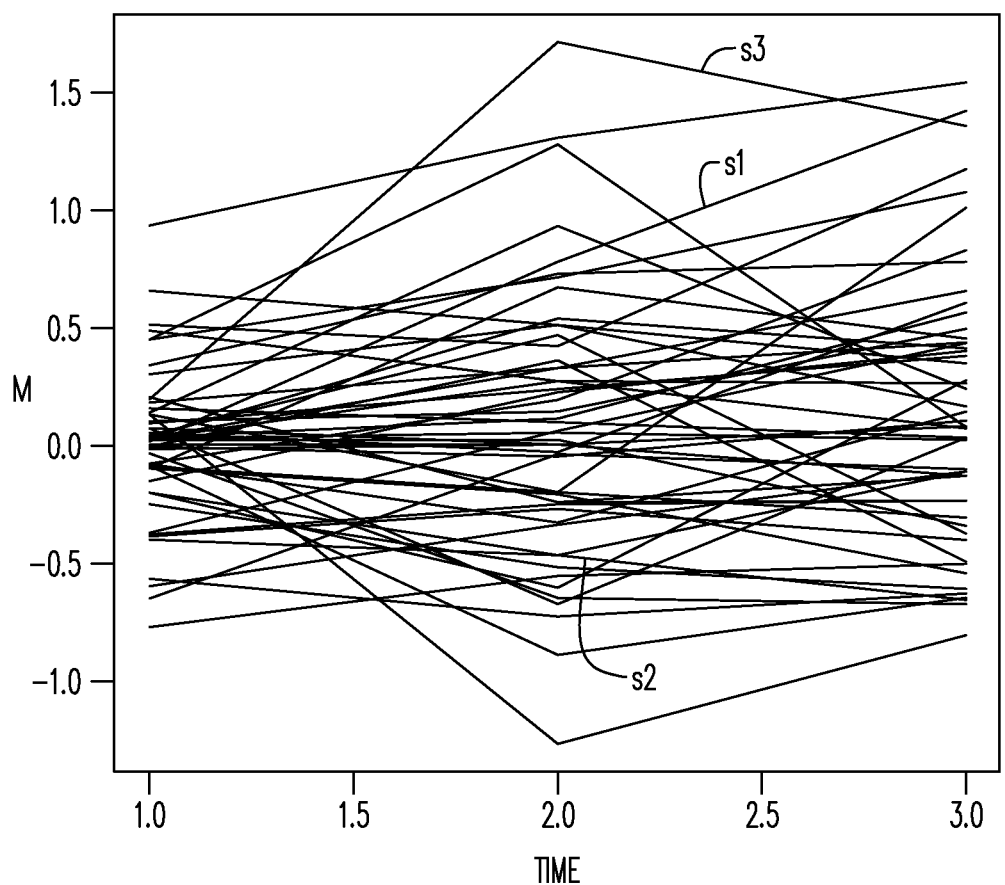
FIG. 8 is a plot that shows changes over time in space-time parameters in a space-time structure matrix in the predictive model as applied to data points in a simulated data set.

FIG. 8 is a plot that shows changes over time in space-time parameters in a space-time structure matrix in the Model as applied to data points in a simulated data set. In the simulated data set, there are 3 time-periods. Each line in the plot represents a different point in space s, and shows the change in the space-time parameters as they progress through the 3 time-periods. This plot shows a variety of patterns. Some points in space have a decreasing M effect through time while others are increasing, and still others reverse direction. For example, the line associated with point in space s1 (and so labeled in FIG. 8) is increasing, the line associated with point in space s2 (and so labeled in FIG. 8) is decreasing, and the line associated with point in space s3 (and so labeled in FIG. 8) first increases and then later decreases. Thus this plot shows interaction between time and space, illustrating non-separability of space-time in the Model for this simulated data set.

Referring again to FIG. 3, at 306 the model generation and prospect selection computer 102 applies the parameterized Model to a data set that represents a universe of potential prospects for insurance policy marketing activities. The universe of potential prospects may, for example, encompass most or all adult residents/households in the United States, or some subset thereof. Data sets that represent such a universe of potential prospects are commercially available. A purpose of block 306 is to assign a score (e.g., a value of or probability of the dependent variable) to each prospect and to then rank order the prospects according to their scores.

Next, at 308, the model generation and prospect selection computer 102 generates a list of the most desirable prospects from the universe of prospects. For example, a prospect may be selected for the list if the prospect's score exceeds a threshold level. The threshold level may be set based on the available budget for marketing activities.

FIG. 9 is a table that illustrates data for a simulated data set of potential prospects that have been scored and ranked by the model generation and prospect selection computer 102 using an embodiment of the model. Column 902 in FIG. 9 contains identifiers for the potential prospects listed in each row of FIG. 9. Columns 904-906 in FIG. 9 correspond to the values for each prospect of the independent variables X01, . . . , X15 utilized in a simulated example embodiment of the Model. (The actual number of independent variables may be more or fewer than the 15 independent variables depicted in the drawing. The ellipsis shown at 908 corresponds to columns for independent variables not explicitly represented in the drawing.) The independent variables X01-X15 may for example be demographic attributes (e.g., age, household income, education level, etc.) of the potential prospects and may have been selected from among numerous possible independent variables available in commercially available data sets.

Columns 910 and 912 specify the location of each potential prospect in terms of latitude and longitude. Column 914 indicates for each potential prospect a point in time represented by the respective data record for the potential prospect. Column 916 contains the predicted value of the dependent variable for each potential prospect. In this example, the dependent variable is assumed to be the predicted insurance premium amount that would be paid by the potential prospect. Except for the prospect identifiers in column 902, all of the data contained in the table may be normalized, and thus does not directly show the raw data values.

The predicted premium amount (evaluation of the dependent variable) may function as the score assigned to each prospect by the Model. In the table of FIG. 9, the prospects are ranked by score, and thus are listed in order of decreasing values of the predicted premium amount. A threshold represented by dash-dot line 918 may be set to select the N highest ranking prospects, where the marketing budget is sufficient to allow for solicitation of that number of prospects. Thus the rows from the top of the table down to threshold 918 may correspond to the list of selected prospects.

At 310, the model generation and prospect selection computer 102 outputs the list of prospects to the marketing computer 108. The marketing computer 108 receives the list of prospects from the model generation and prospect selection computer 102, and, at 312, dispatches marketing offers (e.g., direct mail pieces, marketing electronic mail messages, etc.) to the prospects on the list. The marketing offers may, for example, relate to automobile insurance or homeowner's insurance.

Figure 10:
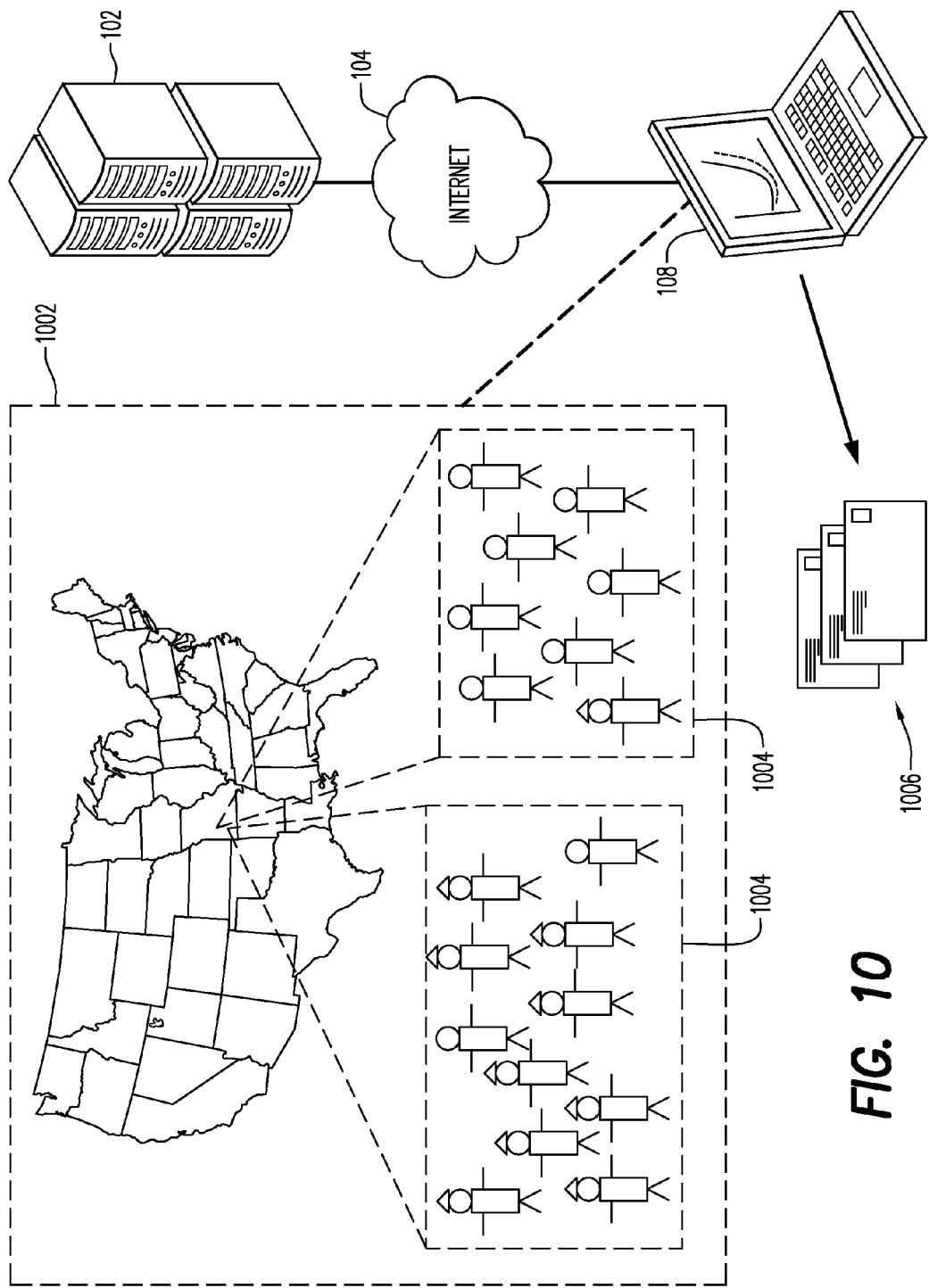
FIG. 10 is a schematic illustration of an outcome of the process of FIG. 3.

FIG. 10 is a schematic illustration of an outcome of the process of FIG. 3. The model generation and prospect selection computer 102 and the marketing computer 108, coupled to each other, at least at some point in time, via the network 104. As discussed in connection with FIG. 3, the model generation and prospect selection computer 102 stores and trains a predictive model, as described herein, and applies the trained model to a data set of potential prospects. The model generation and prospect selection computer 102 scores and ranks the prospects and selects the best prospects based on their scores. The model generation and prospect selection computer 102 then transmits a list of the selected prospects to the marketing computer 108. Box 1002 in FIG. 10 depicts groups 1004 of prospects who correspond to the list downloaded to the marketing computer 108. As depicted, the prospects are situated at various locations in the United States. Using the downloaded list of prospects, the marketing computer 108 generates a batch 1006 of mail pieces that are addressed to the prospects on the list and that contain solicitations for the prospects to purchase insurance from the insurance company that operates the marketing computer 108.

The present inventor has found that building the Model with Bayesian inference and including a structured spatial error component in the Model leads to better fitting of the Model to the training data set than was possible with earlier techniques. Moreover, inclusion of a structured temporal error component in the Model may allow the Model to make some adjustments to events such as a financial crisis which may influence prospects' behavior. It may also be the case that inclusion of the structured temporal element in the Model may extend the effective useful life of the Model before retraining or reconstruction of the Model becomes necessary or desirable.

The Model described above includes a spatio-temporal structured error component but may instead include a structured error component that is spatial but not temporal, or temporal but not spatial. Also, in an alternative embodiment of the Model, if a spatio-temporal structured error component is employed, it may be separable rather than nonseparable.

In some embodiments, a probit link function may be used rather than a logit link function.

Processes portrayed herein as being performed by one computer may in practice be divided among two or more computers. Processes portrayed herein as being performed by two or more computers may in practice be performed by a single computer. For example, the model generation and prospect selection computer 102 and the marketing computer 108 may be integrated together as a single computer.

The principles of the present invention may be applied in connection with marketing of any and all types of commercial, business and individual/personal insurance products, including but not limited to motor vehicle insurance, and homeowner's insurance. The principles of the present invention may further be applied to financial products other than insurance.

Up to this point, the invention has primarily been discussed in connection with potential solicitations of new customers. However, the principles of the invention are also applicable to marketing efforts by an insurance company directed to current customers of the company. Such efforts may include, for example, cross-selling, up-selling, insurance policy renewals and insurance policy modifications.

The term "prospects" as used herein and in the appended claims includes individuals, households and businesses.

The process descriptions and flow charts contained herein should not be considered to imply a fixed order for performing process steps. Rather, process steps may be performed in any order that is practicable.

As used herein and in the appended claims, the term "computer" refers to a single computer or to two or more computers in communication with each other and/or operated by a single entity or by two or more entities that are partly or entirely under common ownership and/or control.

As used herein and in the appended claims, the term "processor" refers to one processor or two or more processors that are in communication with each other.

As used herein and in the appended claims, the term "memory" refers to one, two or more memory and/or data storage devices.

As used herein and in the appended claims, an "entity" refers to a single company or two or more companies that are partly or entirely under common ownership and/or control.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system for selecting prospects for insurance marketing activities, the computer system comprising:
   a processor; and
   a memory in communication with the processor and storing program instructions, the processor operative with the program instructions to:
      store at least one equation, the at least one equation defining a predictive model responsive to a plurality of independent variables and a plurality of parameters, and having an associated spatio-temporal error component, the predictive model including a first dependent variable that represents a probability that a respective prospect will respond to a marketing offer, a second discrete dependent variable that represents a probability that the respective prospect will be retained as a customer, and a third dependent variable that represents a predicted insurance premium amount that would be paid by the respective prospect, wherein the second discrete dependent variable has a value of noncontinuation for prospects expected to cancel a policy within a first time period, continuation for prospects expected to cancel the policy within a second time period that is longer than the first time period, and renewal for prospects expected to continue as policy-holders for a third time period that is longer than the second time period;
      evaluate the parameters to parameterize the predictive model in such a way as to reduce the error component;
      apply the parameterized predictive model to a data set, the data set representing a universe of potential prospects for insurance marketing activities and including, for each potential prospect, a spatial component represented as a distance matrix identifying a distance between each of the potential prospects;
      generate, based on results of applying the parameterized predictive model to the data set, a list of selected prospects, the list of selected prospects representing a subset of the universe of potential prospects, wherein the list is ranked according to a score based on (1) the first dependent variable that represents the probability that the respective selected prospect will respond to the marketing offer, (2) the second discrete dependent variable that represents the probability that the respective selected prospect will be retained as a customer, and (3) the third dependent variable that represents the predicted insurance premium amount that would be paid by the respective selected prospect, the predicted insurance premium determined based at least in part on the spatial component; and
      output the list of selected prospects.

2. The computer system of claim 1, wherein the evaluation of the parameters includes iteratively applying Bayesian inference using a training sample data set.

3. The computer system of claim 2, wherein hierarchical Bayesian inference is applied in evaluating the parameters.

4. The computer system of claim 1, wherein the spatio-temporal error component is separable.

5. The computer system of claim 3, wherein the spatio-temporal error component is nonseparable.

6. The computer system of claim 1, wherein the predictive model has a fourth dependent variable that represents a probability that the respective prospect would submit a claim under the policy written for the respective prospect and wherein the score used to rank the selected prospects is further based upon the fourth dependent variable.

7. The computer system of claim 1, wherein the processor is further operative with the program instructions to:
   receive text input that represents a solicitation for an insurance product;
   generate mailing materials that contain the solicitation;
   print the mailing materials; and
   dispatch the printed mailing materials to the selected prospects.

8. A computer system for selecting prospects for insurance marketing activities, the computer system comprising:
   a processor; and
   a memory in communication with the processor and storing program instructions, the processor operative with the program instructions to:
      store at least one equation, the at least one equation defining a predictive model responsive to a plurality of independent variables and a plurality of parameters, and having an associated spatio-temporal error component, wherein the predictive model has a first dependent variable that represents a probability that a respective prospect will respond to a marketing offer, a second dependent variable that represents a probability that a respective prospect will be retained as a customer, and a third dependent variable that represents a predicted insurance premium amount that would be paid by a potential prospect, wherein the second discrete dependent variable has a value of noncontinuation for prospects expected to cancel a policy within a first time period, continuation for prospects expected to cancel a policy within a second time period that is longer than the first time period, and renewal for prospects expected to continue as policy-holders for a third time period that is longer than the second time period;
      evaluate the parameters to parameterize the predictive model in such a way as to reduce the error component;
      apply the parameterized predictive model to a data set, the data set representing a universe of potential prospects for insurance marketing activities and including, for each potential prospect, a spatial component represented as a distance matrix identifying a distance between each of the potential prospects;
      generate, based on results of applying the parameterized predictive model to the data set, a list of selected prospects, the list of selected prospects representing a subset of the universe of potential prospects, wherein the list is ranked according to a score based on (1) the first dependent variable that represents the probability that the respective selected prospect will respond to the marketing offer, (2) the second discrete dependent variable that represents the probability that the respective selected prospect will be retained as a customer, and (3) the third dependent variable that represents the predicted insurance premium that would be paid by the respective selected prospect, the predicted insurance premium determined based at least in part on the spatial component; and
      output the list of selected prospects;
   wherein the evaluation of the parameters includes iteratively applying Bayesian inference using a training sample data set.

9. The computer system of claim 8, wherein the spatio-temporal error component is nonseparable.

10. The computer system of claim 8, wherein the predictive model has a fourth dependent variable that represents a probability that the respective prospect would submit a claim under a policy written for the respective prospect and wherein the score used to rank the selected prospects is further based upon the fourth dependent.

11. A method for selecting prospects for insurance marketing activities, the method comprising:

storing at least one equation in a computer, the at least one equation defining a predictive model responsive to a plurality of independent variables and a plurality of parameters, and having an associated spatio-temporal error component, wherein the predictive model has a first dependent variable that represents a probability that a respective prospect will respond to a marketing offer, a second dependent variable that represents a probability that a respective prospect will be retained as a customer, and a third dependent variable that represents a predicted insurance premium amount that would be paid by a potential prospect, wherein the second discrete dependent variable has a value of noncontinuation for prospects expected to cancel a policy within a first time period, continuation for prospects expected to cancel a policy within a second time period that is longer than the first time period, and renewal for prospects expected to continue as policy-holders for a third time period that is longer than the second time period;

evaluating the parameters by the computer to parameterize the predictive model in such a way as to reduce the error component;

applying the parameterized predictive model by the computer to a data set, the data set representing a universe of potential prospects for insurance marketing activities and including, for each potential prospect, a spatial component represented as a distance matrix identifying a distance between each of the potential prospects;

generating by the computer, based on results of applying the parameterized predictive model to the data set, a list of selected prospects, the list of selected prospects representing a subset of the universe of potential prospects, wherein the list is ranked according to a score based on (1) the first dependent variable that represents the probability that the respective selected prospect will respond to the marketing offer, (2) the second discrete dependent variable that represents the probability that the respective selected prospect will be retained as a customer, and (3) the third dependent variable that represents the predicted insurance premium that would be paid by the respective selected prospect, the predicted insurance premium determined based at least in part on the spatial component; and outputting the list of selected prospects.

12. The computer system of claim 11, wherein the predictive model has a fourth dependent variable that represents a probability that the respective prospect would submit a claim under a policy written for the respective prospect and wherein the score used to rank the selected prospects is further based upon the fourth dependent.

13. The computer system of claim 8, wherein the spatio-temporal error component is separable.

14. The computer system of claim 8, wherein the processor is further operative with the program instructions to:

receive text input that represents a solicitation for an insurance product;
generate mailing materials that contain the solicitation;
print the mailing materials; and
dispatch the printed mailing materials to the selected prospects.

15. The method of claim 11, wherein evaluating the parameters by the computer comprises iteratively applying Bayesian inference using a training sample data set.

16. The method of claim 15, wherein hierarchical Bayesian inference is applied in evaluating the parameters.

17. The method of claim 11, wherein the spatio-temporal error component is separable.

18. The method of claim 16, wherein the spatio-temporal error component is nonseparable.

19. The method of claim 11, further comprising:

receiving by the computer text input that represents a solicitation for an insurance product;
generating mailing materials that contain the solicitation;
printing the mailing materials; and
dispatching the printed mailing materials to the selected prospects.

* * * * *